United States Patent [19]

Deschenes et al.

[11] 3,718,764
[45] Feb. 27, 1973

[54] TERMINAL UNIT FOR CREDIT ACCOUNT MAINTENANCE SYSTEM

[72] Inventors: Raymond J. Deschenes; Robert N. Macdonald, both of Atlanta, Ga.

[73] Assignee: Data Card Corporation, Minneapolis, Minn.

[22] Filed: March 11, 1970

[21] Appl. No.: 18,571

[52] U.S. Cl. .........179/2 DP, 340/152 R, 340/149 A, 179/2 CA
[51] Int. Cl. ...........................................H04m 11/06
[58] Field of Search ............179/2 DP, 2 R, 3, 4, 2 A; 235/61.7 B, 92; 340/149 A, 152

[56] References Cited

UNITED STATES PATENTS

| 3,305,839 | 2/1967 | Looschen | 179/2 DP |
| 3,314,051 | 4/1967 | Willcox | 179/2 DP |
| 3,308,238 | 3/1967 | Brothman | 235/61.7 B |
| 3,549,809 | 12/1970 | Stehr | 179/2 DP |
| 3,400,378 | 9/1968 | Smith | 179/2 DP |
| 3,203,593 | 8/1965 | James | 235/92 |
| 3,315,230 | 4/1967 | Weingart | 340/149 A |
| 3,221,934 | 12/1965 | Klaffky | 179/2 |
| 3,407,387 | 10/1968 | Looschen | 340/152 |

OTHER PUBLICATIONS

IBM Technical Disclosure Vol. 9 No. 2 July 1966 p. 144. Allen, et al.

Primary Examiner—William C. Cooper
Assistant Examiner—Thomas D'Amico
Attorney—Irons, Sears, Staas, Halsey and Santorelli

[57] ABSTRACT

A system for maintaining an up-to-date record of credit accounts at a central station includes terminal units at a plurality of remote stations. Each terminal unit selectively interrogates the credit account data stored at the central station by transmitting a message of inquiry regarding the particular account of interest to the central station. The central station responds to an inquiry message to access the pertinent data from the account record and to formulate a reply message advising the inquiring terminal unit of the status of the account. No inquiry message is transmitted until the data from which the message is assembled is entered into a data storage device in the terminal unit. Upon receiving a signal denoting establishment of a message communication path between the terminal unit and the central station and a concurrent signal signifying completion of entry of message data into the storage device, the terminal unit transmits the inquiry message to the central station. The reply message from the central station produces an appropriate visual signal at the terminal unit.

3 Claims, 10 Drawing Figures

INVENTORS
RAYMOND J. DESCHENES
ROBERT N. MACDONALD

INVENTORS
RAYMOND J. DESCHENES
ROBERT N. MACDONALD

Inventors
RAYMOND J. DESCHENES
ROBERT N. MACDONALD

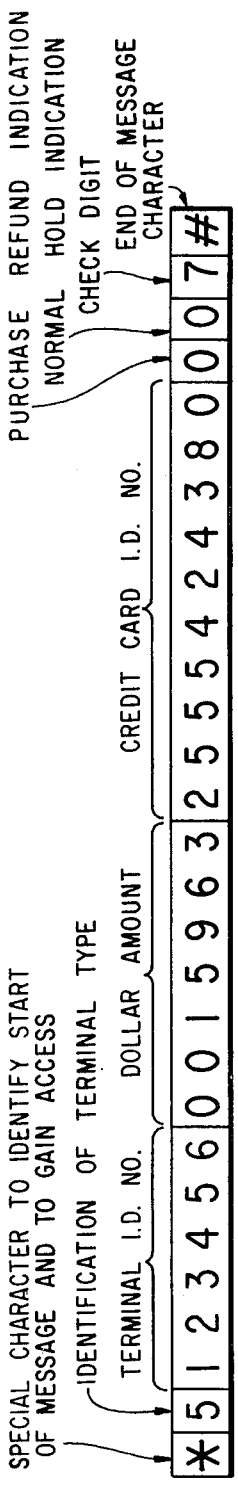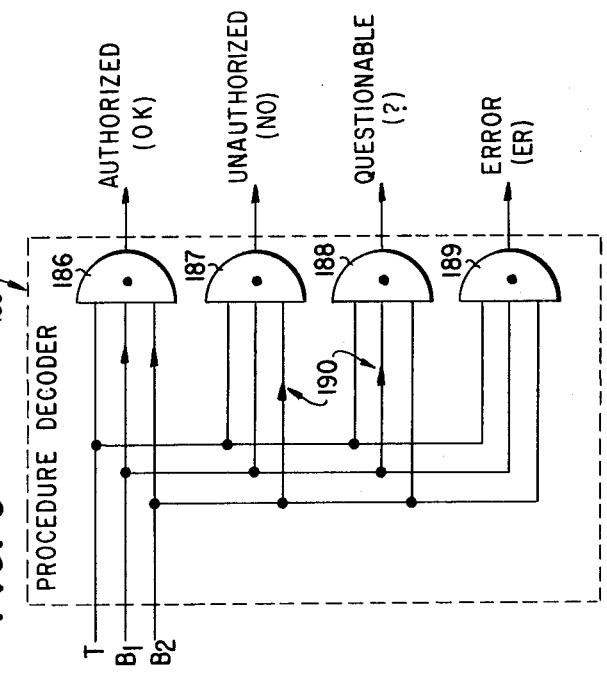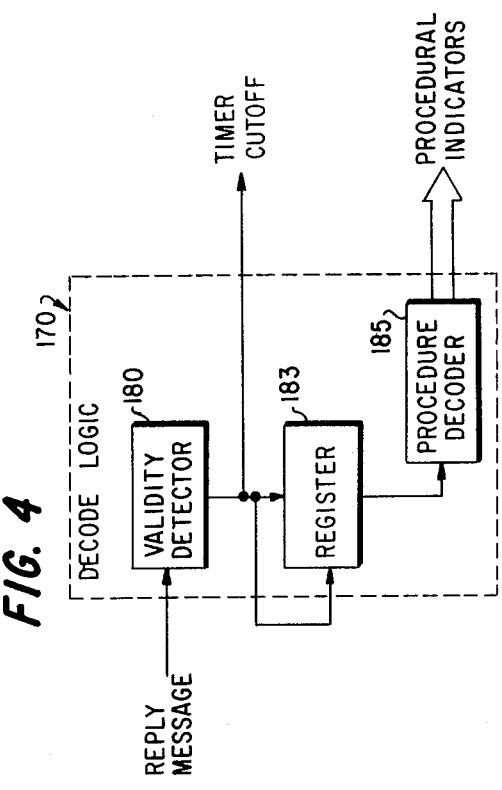

TERMINAL UNIT FOR CREDIT ACCOUNT MAINTENANCE SYSTEM

BACKGROUND OF THE INVENTION

1. Field of the Invention

The present invention resides in the field of terminal units for data storage and retrieval systems for transactions involving credit accounts.

2. Prior Art

Many systems have previously been proposed in which a terminal unit is provided at a cashier's station (i.e., a point of sale) in a retail store to permit the cashier to check the credit of a customer who desires to have a purchase charged to his credit account. Typically, the account number of the customer and the amount of the purchase are manually entered into the terminal unit by the cashier. The terminal unit is connected to a nearby central record storage facility having a computer which responds to the data entered by the cashier to retrieve stored information regarding the status of the designated account and to compare that information with the newly entered data. The purpose of this type of system is to apprise the cashier of the condition of the account of the customer seeking credit before an actual transaction is completed. The cashier is then in a position to determine whether credit should be extended to the customer to cover the purchase in question, or credit should be refused.

The cost of the typical terminal unit used in the prior systems has been sufficiently great to preclude the installation of a terminal unit at each cashier's station in a large retail store. The cashier at a station lacking a terminal unit must call a cashier at a station having a terminal unit, to institute a check of the customer's credit before completing the credit transaction. The result is a loss in the efficient utilization of personnel, in addition to a slowdown in the speed with which a credit check could be obtained with a system having a terminal unit at each station.

Another problem occurring in prior art systems is that the computer must be on-line before the cashier is permitted to enter data regarding the transaction at the terminal unit. Otherwise, the message to the computer will be incomplete and will not evoke the desired response. This has meant that the cashier must manually enter data at the expense of valuable computer time, and at the loss of communication time to other terminal units waiting to transmit messages to the computer.

A further difficulty with prior art credit inquiry systems is that many require the cashier to decipher a lengthy stream of encoded data received in response to an inquiry in order to determine how to handle the transaction. Such a requirement assumes that the cashier is sufficiently skilled to perform the task of deciphering a perhaps complex message rather quickly. Otherwise, the customer will encounter substantial delay in a credit transaction.

In order to produce a written record of a credit card transaction, it has been the practice to provide an auxiliary imprinter at the cashier's station. The auxiliary imprinter is completely distinct from the terminal unit itself and is merely used to transfer an inked impression of the embossed characters on the credit card to a sales slip. Thereafter, the cashier completes the necessary entries on the sales slip by hand, for the customer's signature. This practice requires the cashier to perform two separate but related operations; the first, entering message data into an information retrieval system, and the second, entering at least some of the same data onto a printed form. The undesirable duplication of effort can result in dissatisfaction of the cashier and will result in delay to the customer.

SUMMARY OF THE INVENTION

The principal object of the present invention is to provide a terminal unit for use in a credit account investigation and maintenance system, and which avoids the several disadvantages of the prior terminal units set forth above.

In describing an exemplary embodiment of the invention, it will be convenient hereinafter to refer to any input/output device at a station other than the central station as a "terminal unit." Moreover, since systems according to the invention are useful to diverse companies, such as sales organizations, service firms, and credit investigation agencies, the specific location of any terminal unit will hereinafter be termed a "remote station," regardless of whether it is a point of sale, a point of service, a credit account desk, or other point. For the same reason, the party operating the terminal unit at any remote station will hereinafter be referred to as the "operator," despite the fact that such party may perform some additional function, such as would a sales clerk, a cashier, a service representative, a credit manager, and so forth.

Briefly, a system to record, to retrieve, and to manipulate data in credit accounts as credit transactions occur includes a multiplicity of terminal units. Each terminal unit is located at a remote station relative to a central data processor station. Input data regarding a credit transaction is manually entered into a terminal unit to form a message of inquiry for transmission to the data processor. In response to the message of reply received from the data processor, the terminal unit produces an appropriate output. In particular, each terminal unit is provided with visual indicator means to be energized by and in accordance with the contents of the reply message, to fully inform the operator how to proceed with respect to the credit transaction on which the inquiry is based. Each terminal unit preferably is also provided with means for producing a record of a completed transaction.

In a specific embodiment of the present invention, the terminal units are implemented to store input data entered by the operator, prior to transmission of the data to the data processor. Upon entry of all of the data required to form an inquiry message, a signal is generated within the terminal unit. This signal initiates an attempt to acquire an idle communication channel between the terminal unit and the central data processor. If the attempt is successful, a second signal is received from the data processor over the acquired communication channel. The first signal is sufficiently long to be present when the second signal is received, and the concurrence of these two signals at the terminal unit initiates transmission of the inquiry message. This concurrence condition is important for two reasons. First, it assumes that no transmission will occur from the terminal unit if any message data remains to be entered therein, regardless of the receipt of a signal from the data processor. Second, it prevents the readout of message data when no communication channel is available. The second case is particularly significant where the data storage device undergoes destructive readout. Moreover, in both cases the message data must be manually entered before the data processor is on-line. Valuable time of both the data processor and the communications network is thereby conserved, permitting utilization of both by other terminal units while a given terminal unit is being fully prepared for transmission of an inquiry message.

The data processor responds to an inquiry message from a terminal unit to assess the status of the credit account pertaining to the inquiry, and to transmit a coded reply message based on the account status. The inquiring terminal unit decodes the reply message and, based on the contents of that message, generates the proper visual signal for the procedure to be followed by the operator.

Each terminal unit is provided with timer means for producing a signal to clear the terminal unit and to release its communication channel with the data processor in the event that no reply message is received by the terminal unit within a timed interval from the transmission of the inquiry message. Such operation assures that no terminal unit will tie up the data processor and a communication channel waiting for a non-existent reply message. However, provision is made for the terminal unit to hold a communication channel where several inquiry messages are to be transmitted in a succession interrupted only by the replies. The operator may elect to use this "hold" mode at a busy terminal unit, i.e., a terminal unit at which a high incidence of credit transactions is occurring.

An imprinter unit provided in each terminal unit is responsive to the manual entry of certain message data into storage to simultaneously position corresponding characters in imprinting position for producing a printed record of the transaction. If the reply message from the data processor authorizes completion of the transaction, a normally locked imprint mechanism associated with the imprinter unit is automatically unlocked to permit manual actuation of the mechanism for imprinting a sales slip. The imprinter unit includes means responsive to the return of the imprint mechanism to a locked condition to release the communication channel and to clear the terminal unit. Here again, if the terminal unit is in a "hold" mode, the communication channel will not be released despite locking of the imprint mechanism.

Each terminal unit also includes an authorization count display which is advanced one unit with each authorized transaction occurring at that terminal unit. A purchase refund switch is also provided on the terminal unit to permit the operator to select terminal unit operation appropriate to the type of credit transaction.

BRIEF DESCRIPTION OF THE DRAWINGS:

The above and other objects, features and advantages of the present invention will become apparent from a consideration of the detailed description of a preferred embodiment, in which reference will be made to the accompanying drawings. In the drawings:

FIG. 4 is a circuit diagram of a decoding unit used in the terminal unit of FIGS. 2 and 3;

FIG. 5 is a circuit diagram of a portion of the decoding unit of FIG. 4;

FIG. 6 is a view of the front face of a typical sales slip on which transaction data has been imprinted by the terminal unit of FIGS. 2 and 3;

FIG. 7 is a fragmentary side view, partly in phantom, of a latch switch for use with the imprinter of the terminal unit;

FIG. 8 is a representation of the contents of a message of inquiry transmitted from a terminal unit;

FIG. 9 is a side view of an embodiment of a slide switch and linkage for use in the terminal unit.

Figure 1:
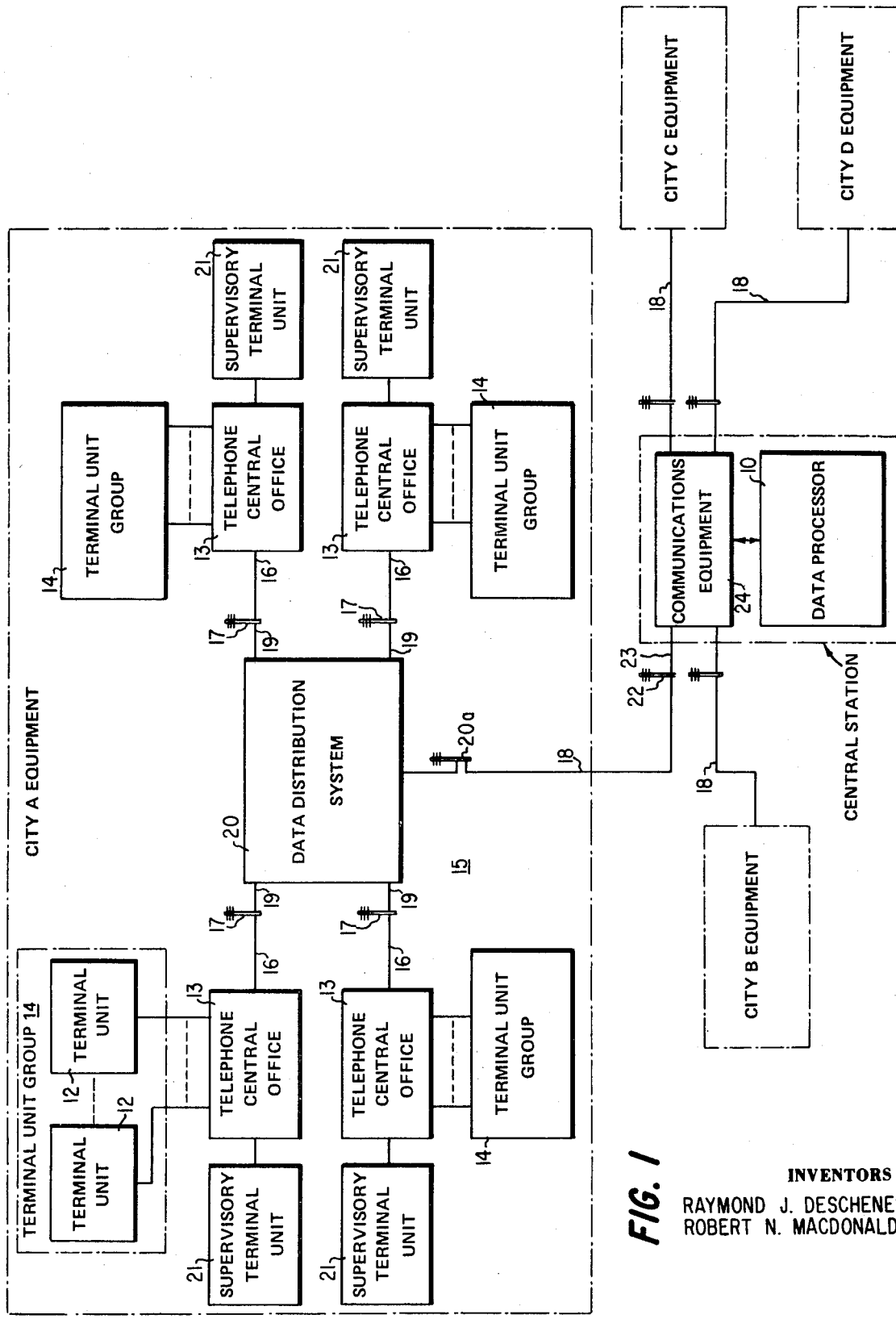
FIG. 1 is a circuit diagram of an overall credit maintenance system in which the terminal unit of the present invention is used.

DESCRIPTION OF THE PREFERRED EMBODIMENT:

Referring to FIG. 1, a system for handling credit transactions includes a data processor 10 located at a central station. The data processor includes a computer with a memory unit having adequate capacity to store the credit account information necessary to permit the data processor to respond to inquiries regarding the status of any member's credit account. The inquiries are transmitted to the data processor from any of a plurality of terminal units 12 located at remote stations assigned by organizations authorized to use the system. These remote stations may be located in several cities, including the same city in which the data processor 10 is located. Only the local equipment in City A is shown in any detail in FIG. 1, but it is to be understood that this equipment is typical of the equipment in City B, City C, and so forth. Upon receipt of an inquiry from any terminal unit 12, data processor 10 checks the status of the account which is the subject of the inquiry and transmits a reply to the inquiring terminal unit.

A communications network 15 is provided to interconnect the terminal units 12 and the central data processor 10. Preferably, the communications network 15 utilizes ordinary telephone lines, some of which are used for handling relatively low rates of data transmission, and others of which are used for handling relatively higher rates of data transmission. In particular, transmission of data at a low rate from each terminal unit allows a group 14 of several terminal units to contend for a single local line 16. The low speed transmission of data over local lines 16 is nevertheless sufficiently rapid to preclude the tying up of any local line 16 by only a few terminal units 12 of a group 14 contending for that line. A supervisory terminal unit 21 is associated with each group 14 and is coupled to the same telephone central office 13 for use of the same switching equipment.

The low speed data on all local lines 16 in a given geographical area, such as in an entire city, is ultimately compressed together i.e., is multiplexed) for transmission at a substantially higher data rate on a feeder line 18 to the central data processor 10. In essence, each local line 16 acts as a branch line for one feeder line 18 which constitutes a trunk line. Multiplexing of data from several local lines 16 to a trunk line 18 in communications network 15 is performed by a data distribution system 20, in each geographical area. Each data distribution system 20 also serves to distribute high speed data from the trunk line 18 to the respective local lines 16, in the opposite direction of transmission. The local lines 16 are connected to the data distribution system 20 by lines 19 from telephone poles 17. Of course, the communications network 15 may use underground transmission lines, rather than "open wire" transmission lines, or a combination of both. Moreover, the communications network may utilize microwave transmission channels along a part of its route. Specific reference is made to the use of ordinary telephone lines only because they are readily available and are relatively inexpensive to lease, in comparison with some other forms of transmission channels. Each data distribution system 20 is connected to its respective trunk line 18 via a line from a pole 21a.

Each trunk line 18 serving a multiplicity of remote stations in a given geographical area is, in turn, coupled to communications equipment 24 via a line 23 from a pole 22. The communications equipment 24 is utilized to supply high speed data from the several trunk lines 18 to the central data processor 10, and to distribute high speed data from the data processor to the appropriate trunk lines. Accordingly, communications equipment 24 may correspond quite closely to a data distribution system 20 in data multiplexing and data distributing performance and implementation. In addition, the communications equipment includes transmitting and receiving apparatus for communicating with the data processor 10.

Further details of the system of FIG. 1, other than details of the terminal unit 12, are not essential to a complete disclosure of the present invention and to a thorough understanding of the invention. Accordingly, no further description of the system will be presented here. The interested reader is referred to the co-pending United States patent application of R. J. Deschenes, et al., Ser. No. 18,665, entitled "System For Maintaining the Status of Credit Accounts," filed Mar. 11, 1970, for system details.

Figure 2:
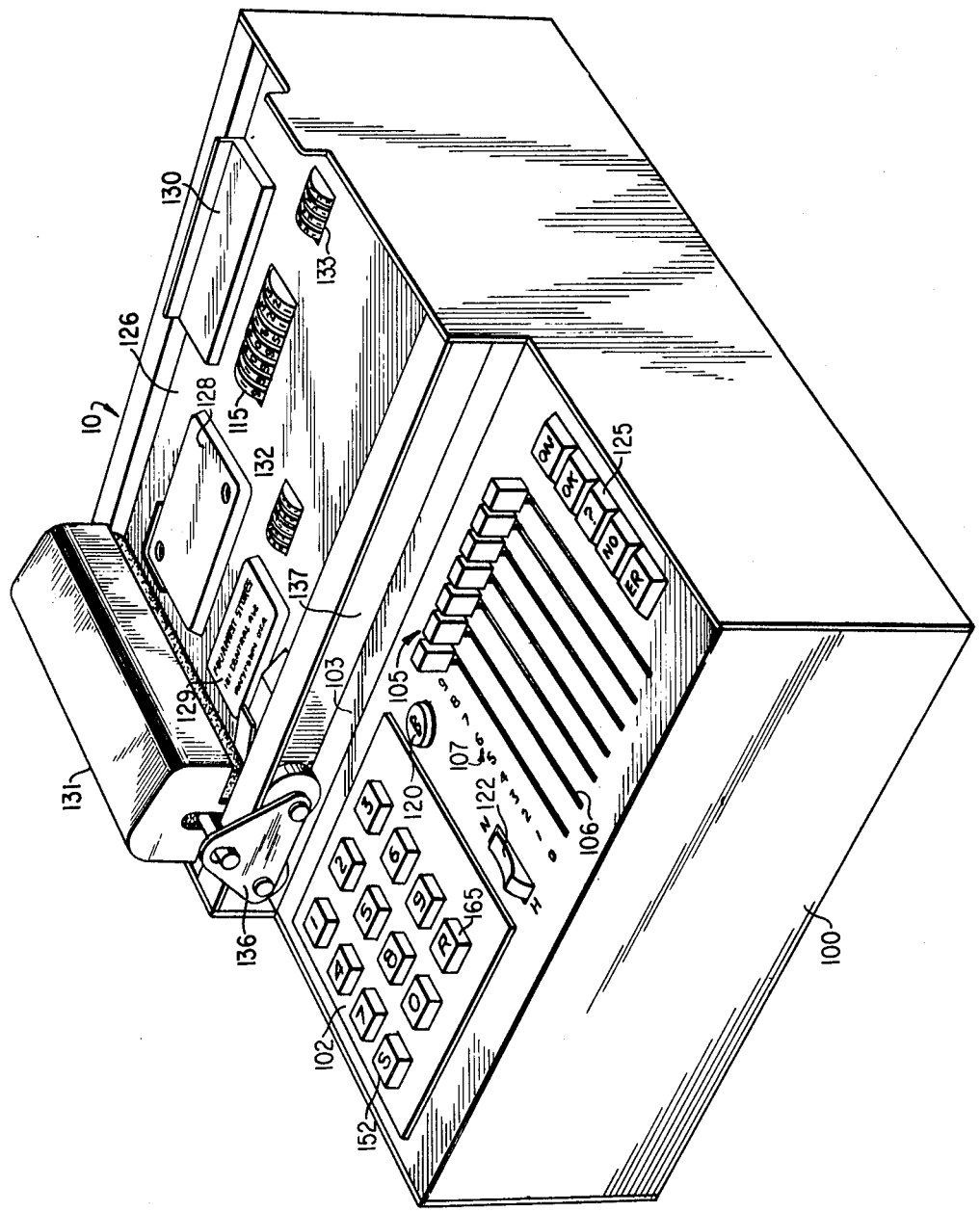
FIG. 2 is a perspective view of the cabinet of a preferred embodiment of the terminal unit, showing an imprinter and various control keys and switches.
Figure 3:
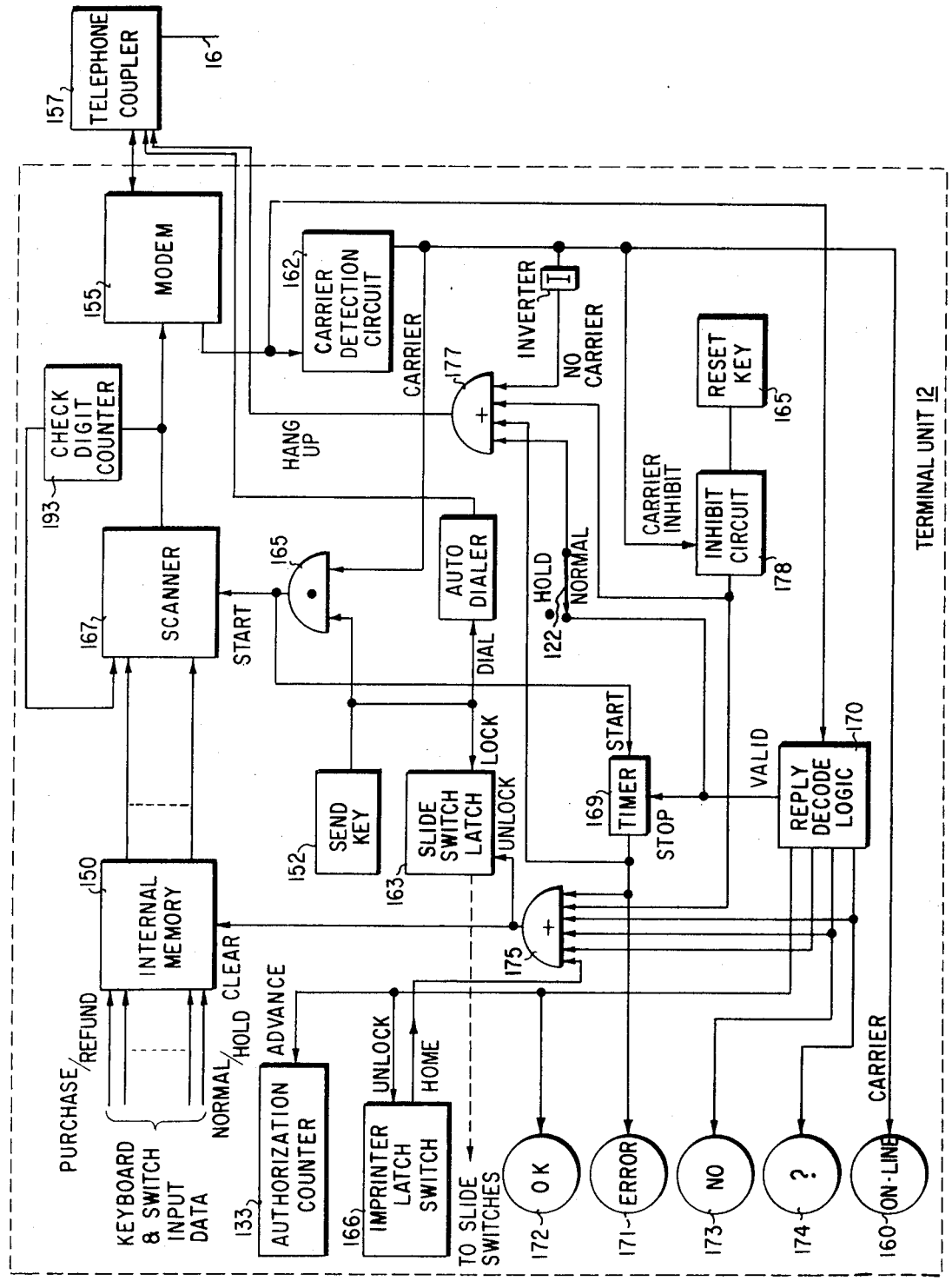
FIG. 3 is a circuit diagram of the terminal unit of FIG. 2.

Referring to FIGS. 2 and 3, showing the cabinet and the circuitry, respectively, of an embodiment of a terminal unit 12 according to the present invention, each terminal unit is preferably implemented to accept a credit card of an individual or of an organization involved in a particular credit transaction. It is to be emphasized, however, that it is neither essential to the overall system in general, nor to the terminal unit in particular, that a credit card be utilized during the course of the transaction. In the terminal unit of FIGS. 2 and 3, the customer's name and identification number (i.e., account number) typically embossed on the credit card are conveniently imprinted by a cooperating imprinting mechanism on a sales slip which will constitute a record of the transaction. If the terminal unit is to be used in credit transactions where credit cards are not required, the imprinting mechanism may obviously be dispensed with in the design of the unit.

With specific reference now to FIG. 2, cabinet 100 of a typical terminal unit 12 is provided with several keys and switches to permit the operator to enter data pertaining to the transaction into the terminal unit, for ultimate transmission to the data processor 10. A keyboard 102 having ten digit keys ranging from 0 to 9, and having two auxiliary keys labeled "S" and "R" which will be discussed presently, is provided on a front surface 103 of cabinet 100. The ten digit keys may be arranged in any convenient manner to make them readily accessible and efficiently used by the operator. For example, these keys may be arranged in the same order as the buttons on a standard telephone set pushbutton dial, but that arrangement is obviously not essential. The digit keys on keyboard 103 are used by the operator to manually enter the account number of the customer into storage in the terminal unit, as a portion of the inquiry message.

Also provided on the front surface 103 of cabinet 100 for easy access to the operator is a set of slide switches 105. Each of slide switches 105 can be moved forward or backward in its respective channel 106, adjacent which is provided a column of digits 107. The slide switches 105 are used to enter the amount of the purchase, in dollars and cents, into a message format to be transmitted to the data processor. Furthermore, slide switches 105 are coupled to a set of wheels 115 bearing raised indicia in units of purchased amount, at the sales slip imprinting region 126 of the terminal unit. As will be discussed in greater detail presently, the slide switches 105 are respectively linked to the raised character wheels 115 to advance the wheels to an imprinting position corresponding to the amount of the purchase, upon appropriate positioning of the knobs of switches 105.

A purchase/refund (P/R) switch 120 is also provided on front surface 103 of cabinet 100, for presetting the terminal unit for use with the proper transaction, that is, to the P position of switch 120 for a purchase transaction and to the R position of the switch for a refund transaction. Switch 120 is normally locked in the P position to prevent inadvertent authorization and recordation of a refund when in fact a purchase transaction is occurring, and to prevent indiscriminate authorization of a refund by the operator. The need for use of a key to operate the P/R switch is itself sufficiently informative to the operator to prevent inadvertent errors or improper use. Nevertheless, it may be desirable to provide only supervisory personnel with a key by which to operate the P/R switch 120. Depending upon the position of that switch, a character indicative of a purchase transaction or a refund transaction is automatically entered into the message format for transmission from the terminal unit.

A normal/hold (N/H) switch 122 consisting of a two-position switch is disposed on front surface 103 of cabinet 100 to permit the operator to select either a normal operation or a hold operation. In the normal operation, the local line 16 which has been acquired by the terminal unit 12 for transmission of an inquiry to the central data processor is released by the terminal unit virtually immediately following receipt of a reply message from the data processor. In other words, the terminal unit must "hang up" in order to terminate its connection to the local line 16 so that the line is available to other terminal units, and this is normally accomplished after each two-way communication. In the hold operation, the connection with local line 16 is maintained by the terminal unit for continued communication with the central data processor for as long as the N/H switch of that terminal unit is in the "hold" position. The hold operation is usually selected by the operator when several messages are to be transmitted in succession to check on the status of several accounts in view of the occurrence of credit transactions involving those accounts. A character representative of the position of the N/H switch 122 is automatically entered at the terminal unit into the message format for any given transaction.

A set of lamps 125 is positioned on front surface 103 of cabinet 100 to be readily observable to the operator. The lamps are preferably color coded, and are also provided with appropriate indicia on their respective caps, to render them distinctive when lit. The lamps are used as guide indicators to inform the operator how to proceed with respect to a given transaction. The content of a reply message in response to an inquiry regarding the given transaction is determinative of which of the lamps 125 is energized, and thereby, what procedure is to be followed by the operator.

A credit card platen 128 and an authorized user identification platen 129 are provided within the sales slip imprint region 126 of cabinet 100. These two platens, along with a boss 130 and two sets of raised character wheels 115, 132 define a substantially level surface over which the roller (not shown) of an imprint mechanism 131 is movable. The two sets of raised character wheels in the sales slip imprint region 126 are for imprinting the dollar amount and the data, respectively, of the transaction on the sales slip. The raised characters on the sets of wheels 115, 132 and on platen 129, and the embossed characters on a credit card placed on platen 128 are all positioned in the plane of the aforementioned level surface to bear against the sales slip at predetermined regions thereof as the roller within imprint mechanism 131 is moved across imprint region 126. The imprint mechanism 131 is restricted to movement over the imprint region by attachment to guide wheels 136 at both sides of the cabinet. The guide wheels roll within channels 137 in the cabinet below and at both sides of the imprint region.

As will presently be discussed in further detail, imprinter 131 has an associated latch to prevent its movement from a "home" position, at the extreme left-hand end of imprint region 126 as viewed in FIG. 2, unless the reply message authorizes completion of the transaction. In the latter event, the imprinter is unlatched for manual movement by the operator. When returned to the "home" position, the imprinter is automatically latched.

With reference now to FIG. 3, the internal circuitry of a typical terminal unit 12 includes an internal memory 150. The internal memory is supplied with input data to be stored in accordance with the operation of keys and switches by the operator for a given transaction. The storage capacity of the internal memory 150 should be sufficient to hold all the data required for a complete inquiry message pertaining to the given transaction. This required data includes, in addition to that manually entered by the operator, several permanently stored items of information. In particular, the permanently stored information consists of characters designating the type and identity of the terminal unit, and designating the start and the end of a message. When the data pertaining to a specific transaction has been entered into internal memory 150, the memory contains a complete inquiry message for that transaction, because the permanently stored characters remain in their appropriate locations for continual proper positioning in any inquiry message.

The operator then depresses a send ("S") key 152 on keyboard 102 in preparation for transferring the inquiry message to the central data processor. In response to actuation of send key 152, a latch mechanism 163 operates to lock slide switches 105 in position to prevent any movement of those switches during actual transmission of an inquiry message. In addition to energizing the slide switch latch mechanism, actuation of send key 152 supplies a signal to initiate the operation of an automatic dialer 154. The dialer 154 serves to establish a communication channel between the terminal unit and the central data processor, as is necessary before the inquiry message can be transmitted. This is accomplished upon acquisition of the appropriate local line 16 by the terminal unit.

Each local line 16 is assigned a unique "telephone" number to determine whether the line is busy, i.e., is in use by another terminal unit sharing that local line, or is idle, i.e., is available. It is preferable that the "telephone" number of the appropriate local line 16 be "dialed" by an automatic dialer upon actuation of send key 152. The automatic dialer 154 responds to actuation of the send key to transmit a series of pulses representing the desired number to a telephone coupler 157 connected to local line 16. If line 16 is idle, a connection is completed with the terminal unit that dialed the number, and the line is thereafter unavailable to other terminal units until the acquiring terminal unit releases the connection (i.e., "hangs up").

Once the connection has been established between the terminal unit and local line 16, a carrier tone is transmitted to the terminal unit from the data processor via that local line. The carrier tone passes through coupler 157 and modem 155 and is thereupon detected by a carrier detection circuit 162. The carrier detection circuit then supplies a signal to one input line of a two-input AND gate 165. The second input of AND gate 165 is energized by a signal from the actuated send key 152. In essence, the send signal is indicative of the completion of entry of data into internal memory 150, and the length of this signal should be sufficient that it is present when the carrier tone is detected. Hence, the input condition of the AND gate 165 is satisfied to cause a "start" signal to be supplied by the AND gate to a scanner 167. The scanner is thereby activated to access message data from the internal memory 150 in the proper inquiry message format.

Accordingly, an inquiry message is transmitted from a terminal unit only upon concurrence of the send signal and the carrier tone, and this occurs after the data for a complete inquiry message has been manually entered by the operator. Such operation insures that no portion of the message will be lost by partial transmission prior to establishment of a connection to the central data processor. Moreover, this operation further insures that the on-line time of the central data processor for a given terminal unit is minimized, because there is no manual entry of data by an operator while the data processor is on-line.

Upon detection of carrier tone, detector 162 supplies an energizing voltage to an "on-line" lamp 160, in addition to energizing one input lead of AND gate 165. The lighting of lamp 160 informs the terminal unit operator that local line 16 has been acquired, and that the inquiry message is being transmitted.

It may happen that one of the other terminal units is using line 16 at the time the number for that line is "dialed" by automatic dialer 154. In that event, a busy signal is encountered and the connection is not completed. The lack of carrier tone at detector 162 prevents the energization of on-line lamp 160, thereby informing the operator that local line 16 is presently unavailable. The operator may then simply wait a few seconds and again depress send key 152 to repeat the attempt to establish the communication channel with the central data processor. The number of terminal units connected to a single local line, and the average length of time for a single transaction communication between any given terminal unit and the central data processor, are taken into consideration prior to installing the system to insure that any given terminal unit will have access to its local line 16 within a matter of only a few seconds. It should be noted that instead of automatic dialer 154, the terminal unit may have an associated telephone handset (not shown) by which the operator can manually "dial" the number of local line 16.

The information scanner 167 is coupled to internal memory 150 to access the stored data therefrom in a predetermined sequence in serial binary format to form the inquiry message. This inquiry message is transmitted by the scanner through modem 155 and into local line 16 for transmission to the central data processor via communications network 15.

The operation involving scanner 167 assumes that the message information is stored in internal memory 150 in parallel storage elements, and that the scanner comprises a commutator or equivalent device. Alternatively, however, internal memory 150 may comprise a shift register into which the message data is entered in specific bit locations upon actuation of the appropriate keys and switches by the operator. In that event, an output from AND gate 165 may conveniently be used to start a shift pulse generator (not shown), which replaces scanner 167, for shifting out the contents of internal memory 150 in serial binary format directly to modem 155.

The output of AND gate 165 also supplies a "start" signal to timer 169. The timer is implemented to generate an output signal at the conclusion of a predetermined timed interval from the starting of the timer. If a "valid" reply message is not received by terminal unit 12 from the central data processor within this timed interval, the timer supplies a signal to OR gates 175 and 177. In response to an input signal on any of its respective input leads, OR gate 175 produces an output to clear internal memory 150 of all temporarily stored message information and to release latch 163 to unlock all switches and keys controlled by that latch, and OR gate 177 produces an output to release local line 16.

A "valid" reply message is any message which is detected by the terminal unit to be free of transmission errors upon receipt from the data processor. In order to detect the presence of an error in a reply message, the message may contain any standard error detecting code for which suitable error detection apparatus is provided at the terminal unit. A reply decode logic circuit 170 is implemented to detect such error and to indicate its presence in the reply message, but is not adapted to correct an error. The reply message is supplied to the reply decode logic circuit via the carrier detection circuit 162. If the reply message is valid, the reply decode logic circuit produces a signal to turn off timer 169 and to "hang up" the terminal unit (via N/H switch 122, if in the "normal" position). In addition, the reply decode logic circuit decodes the message to energize an appropriate one of the procedural guide lamps 125 on the front panel 103 of cabinet 100 (FIG. 2).

If the reply message is not valid, the timer is allowed to conclude its timed interval to supply an output signal to OR gate 175, and thereby to restore the terminal unit to the condition prevailing prior to the entry of inquiry message data. The output signal of the timer is also applied as a momentary "release" signal to another OR gate 177 to "hang up" the connection with local line 16. This precludes a tie-up of valuable communications network time. An error lamp 171 is energized by the output signal of timer 169 to inform the operator that the inquiry message data must be re-entered into internal memory 150 and that a communications channel must be re-acquired with the central data processor, if further inquiry is to be made regarding the status of the credit account involved in the transaction.

Upon detection of a valid reply message from the central data processor 10, the reply decode logic circuit 170 decodes the message to produce various visual indications for imparting procedural information to the operator. The particular indication depends upon the status of the account, and upon any limitations placed upon the account, as recorded in the central data processor. In each instance, the indication is manifested by the energization of an appropriate procecural guide lamp 125. If the contents of the reply message authorize completion of the transaction by the operator, an "authorization" indication is manifested by the energization of an "OK" lamp 172. If the reply message rejects completion of the transaction, the operator is so informed by an "unauthorized" indication, manifested by energization of a "NO" lamp 173. The latter indication should occur where, for example, the credit check at the central data processor reveals that the customer is a poor credit risk, or that the identified account number belongs to a customer who has reported the loss of his credit card. If the reply message conveys the information that the state of the credit account makes completion of the transaction questionable, the operator is given the appropriate indication by the energization of a lamp 174 bearing a question mark (?). Such an indication will occur, for example, where the amount of a specific purchase exceeds the customer's authorized credit limit, or where the balance due on the credit account is ordinarily paid promptly but at the time of this inquiry is overdue. The supervisory terminal unit 21 at the audit station for the terminal unit 12 that transmitted the inquiry may be signalled when the "questionable" indication occurs, to indicate the need for assistance at the latter terminal unit. The replay decode logic circuit 170 may also be implemented to energize the "error" lamp 174 in place of energization of that lamp by timer 169.

Preferably, in addition to bearing appropriate indicia, each of the procedural guide lamps has a distinct and different color from the others. This permits the operator to readily distinguish between lamps, and thus between the procedural information that they relate. The lamps are conveniently color coded to correspond to everyday warning signals. For example, "OK" lamp 172 may be green, error lamp 171 may be yellow or amber, and "NO" lamp 173 may be red to correspond to the usual meanings "Proceed", "Caution", and "Stop", respectively, found in everyday situations. The remaining lamps consisting of "?" lamp 174 and on-line lamp 160 may be blue and white, respectively. However, it will be understood that other colors may be employed for lamps 125, if desired. Again, the important consideration is the provision of a set of visual indicators on the terminal unit in full view of the operator, to apprise the operator of the establishment of a connection with the central data processor, and thereafter, the procedure to be followed with regard to the transaction on which the original inquiry was based.

Referring for the moment to FIGS. 4 and 5, the reply decode logic circuit 170 may have the configuration shown in FIG. 4, and may include a procedure decoder logic circuit 185 having the configuration shown in FIG. 5. The reply message is initially examined in a validity detector 180 to determine whether the reply message is valid. The validity detector may make this determination, for example, by checking one or more parity bits in the reply message. If the message is valid it is passed by validity detector 180 with a preceding additional pulse for turning off timer 169. Assuming that the reply message is in serial binary format, it is fed into a register 183 for temporary storage. Register 183 responds to an end-of-message (EOM) character in the reply message to read out its contents in parallel format to the procedure decoder logic circuit 185. The latter circuit decodes the message and energizes the appropriate procedural indicator lamp 125.

A simplified diagram of procedural decoder logic circuit 185 is shown in FIG. 5. The procedural decoder logic includes four AND gates 186, 187, 188 and 189, each having three input terminals and each connected for parallel receipt of three bits. The reply message need only contain two procedural information bits $B_1$ and $B_2$ to provide any of four possible outputs from reply decode logic circuit 170. Clearly, two bits are necessary and sufficient to provide four distinct and different binary value combinations. The third input bit, T, is the previously mentioned validity information pulse added to the reply message by validity detector 180 only when a valid message has in fact been received. If reply decode logic circuit 170, rather than timer 169, is to energize error lamp 171, one of the four AND gates may either be deleted or replaced by a single input OR gate (not shown) for energization of the error lamp by pulse T. Alternatively, the fourth AND gate may be arranged to receive identical bits on its three input leads for energization of the error lamp. The latter configuration is shown in FIG. 5.

Each of AND gates 186, 187, 188 and 189 therefore receives a validity bit T and two message bits $B_1$ and $B_2$. The AND gates are arranged in conventional decoder circuit form to provide one of four possible outputs depending upon which of the four combinations of the two message bits is present in the reply message. Inverters 190 are provided in some of the input leads in the AND gates as necessary to take care of "0" bits. One and only one of the AND gates can have all of its input leads energized at any given instant of time. The output lead of each gate is connected to a respective one of the procedural indicator lamps 125 to provide an energizing voltage to the appropriate lamp.

Returning now to FIG. 3, the energizing voltage generated by reply decode logic circuit 170 for any of the procedural indication lamps 171, 173, and 174 is also supplied in parallel to an associated input lead of OR gate 175. As described earlier, the presence of a voltage on any of its input leads causes the OR gate to produce an output voltage which clears internal memory 150 of all temporary data, and unlatches all switches which had been latched by slide switch latch 163. The remaining input leads of OR gate 175 are respectively connected to the output lead of timer 169, noted earlier, and to a reset switch 165 and to an imprinter latch switch 166.

Energization voltage applied to "OK" lamp 172 by reply decode logic circuit 170 is also applied in parallel to imprinter latching switch 166 and to authorization counter 133. Thus, when the reply message authorizes completion of the transaction, the "OK" lamp 172 is lighted to so inform the terminal unit operator, and simultaneously with the energization of the "OK" lamp, the authorization counter 133 is advanced one unit and the imprint mechanism 131 is released from its "home" position. The imprint mechanism can then be manually moved across the sales slip imprint region 126 (FIG. 2) to produce a record of the completed transaction. In view of the fact that when a transaction is authorized to be completed the credit account is automatically updated, such a record need not be provided for the store unless a copy is desired as a means to check the account record at the central station. However, the customer will generally be provided with a sales slip for his own records.

Figures 6, 7, 9:
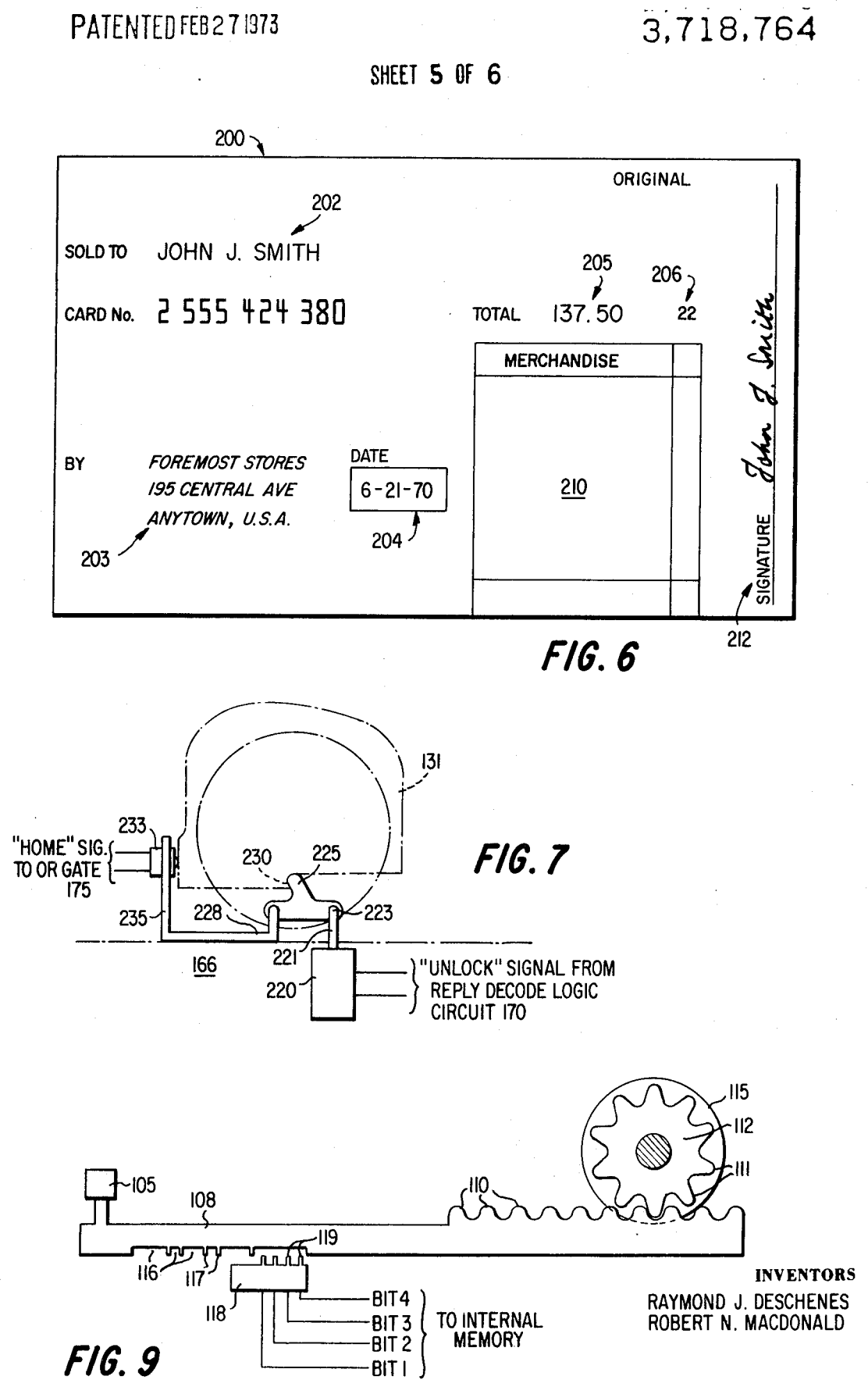

A typical form of sales slip on which a record of the credit transaction is imprinted by terminal unit 12 is shown in FIG. 6. A slip 200 having blank spaces in which the appropriate information is to be printed is placed within imprint region 126, to overlie the customer's credit card and the several platens and character wheels. As the imprint mechanism 131 is moved across the slip, pressure is exerted against all of the embossed and raised characters beneath the slip to produce corresponding visible impressions on the slip. In the specimen of FIG. 6, the impressions include the customer's name and credit account number, in space 202, and the store 203, the date 204, and the amount 205 of the purchase.

After removing the imprinted sales slip from the imprint region 126 of the terminal unit, the operator may write in the authorization number 206 of the transaction and the identity and the cost of each item 210, if this information was not entered previously. The slip may then be handed to the customer for signature on line 212. If the slip is a multisheet document, one copy is given to the customer and the remaining copies are retained by the store.

After the imprint mechanism 131 has been cycled, i.e., to record the transaction, it must be returned to its "home" position. In this regard, it will be observed from FIG. 3 that the energization of "OK" lamp 172 is not accompanied by the energization of an input lead of OR gate 175, as occurs for the energization of each of lamps 171, 173, and 174. Hence, there is no automatic clearing of the internal memory and releasing of all switches and keys. No further credit transactions can be handled by the terminal unit until the memory and the switches are cleared. For the latter purpose, imprinter latch switch 166 is implemented to generate a "one-shot" pulse when the imprint mechanism is returned to its "home" position and is locked in place by switch 166. This pulse is applied to OR gate 175 to clear the memory and the switches in preparation for entry of an inquiry message consonant with the next transaction.

A suitable embodiment of the imprinter latching switch 166 is shown in FIG. 7. A solenoid 220 is mounted by brackets (not shown) within cabinet 100, beneath one side of imprint mechanism 131. An armature 221 projects from the coil housing of solenoid 220 and is pivotally fastened at one end 223 to a catch (i.e., a hook) 225. The catch 225 is also pivotally fastened to a fixed bracket 228 mounted on the upper panel of cabinet 100.

When the solenoid is non-energized, the normal projecting length of armature 221 is such that catch 225 is hooked over a lip 230 of imprint mechanism 131. This serves to prevent movement of the imprint mechanism to the right, as viewed in FIGS. 2 and 7, away from the "home" position. When the solenoid is energized, by a signal from the reply decode logic circuit 170 applied to the solenoid coil, the armature 221 is retracted within the solenoid housing. This causes catch 225 to pivot in the clockwise direction about its pivot point with bracket 228, thereby disengaging from lip 230 and releasing the imprint mechanism.

A spring-loaded microswitch 233 is mounted on an arm 235 to exert pressure against the imprint mechanism. Hence, when latch switch 166 is actuated to the release position, the imprint mechanism is forced clear of the "home" position to prevent recapture by catch 225 after de-energization of the solenoid. Microswitch 233 is mounted relative to the imprint mechanism 131 so that a surface of the imprint mechanism bears against an actuating button of the microswitch when the mechanism is in the "home" position. The microswitch is a one-shot switch in that it generates one and only one output pulse each time the actuating button is depressed. Accordingly, when the imprint mechanism is returned to the "home" position, the microswitch is actuated to produce the pulse which is applied to OR gate 175 (FIG. 3).

The provision of a structure and an operational mode requiring manual movement of the imprint mechanism 131 has several advantages over automatic actuation of the imprint mechanism. First, the transaction record will not be consummated until the operator places the customer's credit card in position on platen 128 (if a credit card is required for the transaction), and optionally checks the date wheels 132 and the authorization counter display 133, because movement of the imprint mechanism is controlled by the operator. If automatic movement were provided, and the credit card were not in position on platen 128, the imprint mechanism would nevertheless go through its cycle. Second, manual operation gives the operator an opportunity to seek supervisory assistance, should the need arise, prior to restoring the terminal unit to a fully cleared condition. Third, manual operation of the imprint mechanism does not require bulky motors and linkages within the terminal unit cabinet, as automatic operation would. Furthermore, the latching of the imprint mechanism upon return to its "home" position assures that there will not be any use of the mechanism to imprint a sales slip unless authorization is given in a reply message to complete a transaction.

Returning again to FIG. 3, the only remaining input lead of OR gate 175 is connected to reset key 165, located on keyboard 102 of cabinet 100 for ready access by the operator. When the reset key is actuated, it energizes that input lead to cause the OR gates 175 and 177 to provide the memory clearing, switch unlocking, and local line releasing functions, respectively, previously described. This manual reset operation may be performed at any time prior to initiation of the sending sequence, that is, at any time before actuation of send key 152 effects the acquisition of local line 16. Thereafter, carrier detection circuit 162 responds to the almost instantaneous reception of carrier tone from the central station to supply an energizing signal to an inhibit circuit 178 in the reset signal path. Accordingly, reset key 165 can no longer be used to initiate the aforementioned functions until the carrier tone is removed. This arrangement assures that the operator will not inadvertently interrupt the sequence by depressing the reset key after a communication channel has been established with the data processor.

When N/H switch 122 is in the "normal" position, as shown in FIG. 3, the terminal unit releases the "connection" with local line 16 via coupler 157 whenever reply decode logic circuit 170 produces an output signal. This is accomplished by connecting the output lead of circuit 170 to an input lead of OR gate 177. The latter OR gate supplies a "hang up" signal to telephone coupler 157 when any one or more of its inputs are energized. In addition to the input from the reply decode logic circuit, OR gate 177 receives inputs from a "loss of carrier" (i.e., absence of carrier tone) output lead of detection circuit 162, from timer 169, and from reset key 165. The "hang up" signal of OR gate 177, or a signal derived therefrom upon release of local line 16, is sensed by the communications equipment 24 at the central station to "hang up" at that end. It is only when both ends of the communication channel are released that the channel itself is completely released.

A typical format for an inquiry message transmitted from a terminal unit 12 is shown in FIG. 8. A total of 29 characters appears in the inquiry message, in the example shown in FIG. 8. The first character in the message identifies the start of the message and is of appropriate form to uniquely identify the source of the message as a unit authorized to operate in the system. The purpose of using such a unique start character is to preclude use of the system by unauthorized equipment. It is possible, for example, that a standard teletype unit might have access to a local line, by surreptitious connection thereto or by improper wiring. Since an unauthorized teletype unit is not capable of generating the unique start character, however, any message transmitted therefrom would be ignored by the central data processor. Alternatively, the central data processor may be implemented to sense the appearance of an improper start character and thereupon to generate an appropriate signal to advise a central data processor operator of the location of the local line on which that message appeared. Appropriate action may then be taken to remove the offending unit from the system.

The second character in the inquiry message identifies the type of terminal unit from which the message was transmitted, if several different types of terminal units are usable in the system. The system may, for example, be implemented to operate basically as a credit account status maintenance system, as described herein, but may also have auxiliary use as a fire or burglar alarm system. That is to say, the central data processor may be implemented or programmed to recognize the specific terminal type from which a message is received, and to generate a signal, such as an alarm, at the central station on the basis that a transmission from that type of terminal unit is itself indicative of the existence of an alarm condition.

Message characters three through eight, inclusive, identify the number of the terminal unit. Each terminal unit has a distinct and different identification number from the other terminal units.

Each of the message characters thus far described is permanently stored in internal memory 150, because the signification of the start of a message, the terminal type, and the terminal identification number will remain fixed regardless of the particular transaction. The last character in the inquiry message, identifying the end-of-message (EOM) is also fixed and, hence, is permanently stored in memory 150. The remaining message characters may vary from transaction to transaction and are therefore entered into temporary storage in memory 150 by the operator.

In particular, the ninth through the fifteenth characters, inclusive, identify the dollar amount of the purchase. These characters are entered by appropriate positioning of the slide switches 105 on the front panel of terminal unit cabinet 100 (FIG. 2). The slide switches are also linked to the set of imprint wheels 115 in the sales slip imprinting region 126. A suitable embodiment of the slide switches and the linkage for accomplishing this dual function will be described presently.

Message characters 16 through 25, inclusive, are entered by means of the digit keys on keyboard 102 to identify the credit account identification number. This is identical to the credit card number where the credit organization (e.g., American Express, Master Charge, etc.) employs credit cards for the purpose of identifying members. One or two of the characters may also be used to identify the particular credit organization to which the customer belongs (e.g., AX for American Express, MC for Master Charge, and so forth).

The twenty-sixth and twenty-seventh characters are the purchase/refund indication and normal/hold indication, respectively. These characters are automatically entered for a particular transaction in accordance with the positions of switches 120 and 122, respectively, adjacent keyboard 102 on front panel 103.

The twenty-eighth character in the message, immediately preceding the EOM character, is a check character which is used as part of an error detection code. The check character is determined by counting the number of binary "1's" (or, alternatively, the number of binary "0's") in the preceding 27 characters of the message, and identifies the total. This is accomplished by a check character counter 193 (FIG. 3) which is responsive to the message character bits emanating from scanner 167 to count the "1's" therein and to supply the total as an input to the scanner for entry in the twenty-eighth character location. When the inquiry message is received at the data processor, the "1's" in the first 27 characters are again counted and the total must tally with the check character. Otherwise, an error is indicated.

The error detection code may also include a parity bit which accompanies each character and indicates whether the binary code for that character has an even number of "1's" (including none), or an odd number. For example, the parity bit is "0" for an even number, and is "1" for an odd number. This may be entered into each character by any known parity bit generation technique.

The table below contains one example of a suitable binary code (and appropriate parity bit) for each character in an inquiry message other than the check character. The check character will always be a number that depends on the binary composition of the preceding characters in the message. Obviously, a minimum of four binary bits is both necessary and sufficient to encode the 16 distinct and different characters which may be used in an inquiry message in this example.

TABLE 1

| Character | Parity | Binary Code |
|---|---|---|
| 0 | 0 | 0000 |
| 1 | 1 | 0001 |
| 2 | 1 | 0010 |
| 3 | 1 | 0100 |
| 4 | 0 | 1001 |
| 5 | 0 | 0011 |
| 6 | 0 | 0110 |
| 7 | 1 | 1101 |
| 8 | 0 | 1010 |
| 9 | 0 | 0101 |
| End of Message | 1 | 1011 |
| Start of Message | 1 | 0111 |
| Purchase | 0 | 1111 |
| Refund | 1 | 1110 |
| Hold | 0 | 1100 |
| Normal | 1 | 1000 |

It will be observed from the Table that the code for characters 0-9 is non-standard. However, any suitable digital code may be used. The reason for preferred use of the code of Table 1 is the ease of constructing the slide switches 105 and their respective linkages to implement this code in comparison to, say, the American Standard Code for Information Interchange (ASCII). Referring to FIG. 9, the linkage associated with each slide switch 105 includes a rack 108 having a series of protuberances 110 uniformly spaced apart adjacent one end of the rack. These protuberances mesh with the teeth 111 of a circular gear 112 journalled into a concentric imprint wheel 115 of the set of dollar amount wheels in the sales slip imprint region. Accordingly, as switch 105 is moved within its respective slot 106 for positioning adjacent a selected numeral in the adjacent column 107 (FIG. 2), wheel 116 is rotated through an appropriate angle to position the same raised numeral thereon in imprinting position.

Rack 108 also has a plurality of slots 116 cut therein to define non-uniformly spaced projecting elements 117. A read head 118 having uniformly spaced sensing elements 119 thereon is fixed relative to the movable slide switch 105. When the slide switch is positioned at the 0 numeral in column 107 the sensing elements 119 of read head 118 are not in contact with any projecting element 117 of rack 108. Hence, none of the four output bit leads associated with respective ones of sensing elements 119 has an output therein. This corresponds to the condition of 0000 as the binary code for the decimal numeral 0 in the above Table. The slots 116 are cut in rack 108 so that projecting elements 117 are positioned to contact sensing elements 119 in accordance with the remainder of the binary code for characters 0–9 shown in the Table. Thus, as the slide switch is moved to a numeral in column 107, the projecting elements 117 contact sensing elements 119 to produce the binary code for that numeral on the four output bit leads. These leads are connected to appropriate storage locations in internal memory 150.

Figure 10:
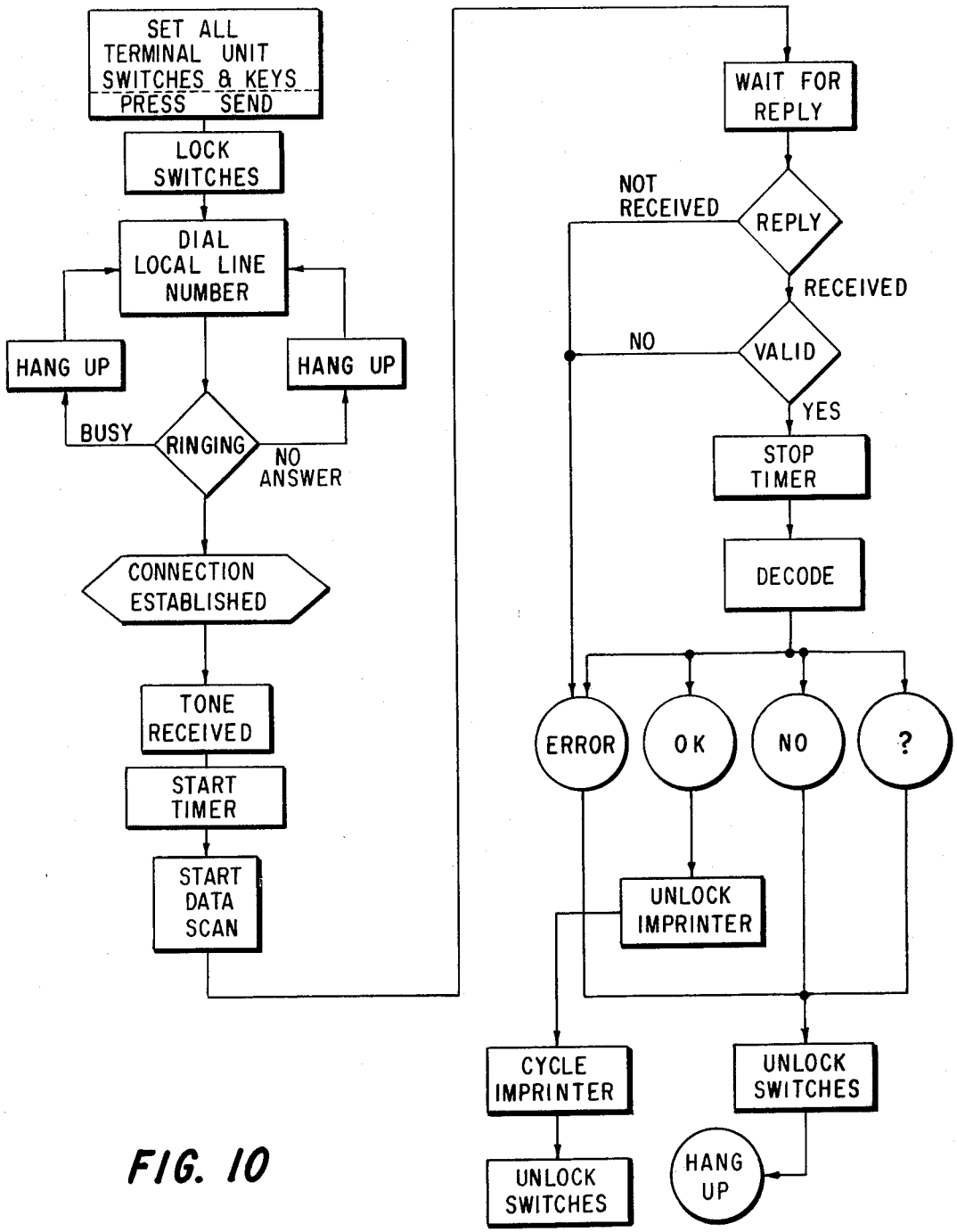
FIG. 10 is a flow chart of the operation of a terminal unit.

The operation of the terminal unit in the overall system should be quite clear from the foregoing description. However, a brief description of the procedure followed at a terminal unit 12 for a transaction will now be described, for the sake of completeness. Concurrent reference is made to the flow chart of FIG. 10. The customer initiates the transaction by presenting his proposed purchases and his credit card to the terminal unit operator. The operator places the credit card on platen 128 and proceeds to set all switches and keys of the terminal unit to enter the data regarding the transaction into internal memory 150. The operator then depresses the send key to actuate the automatic dialer and thereby to acquire local line 16 provided the line is not busy. If it is busy there will be no lighting of the on-line lamp 16, and the operator must repeat the attempt to acquire the local line. If there is no response on repeated attempts, line failure is indicated. When the local line is "captured" a communication channel is established with the central data processor, as indicated by the energization of the on-line lamp. The inquiry message is automatically transmitted to the data processor in response to concurrence of the send signal and the received carrier tone.

The timer 169 is started at virtually the same instant that the data in memory 150 is scanned. If a reply is received from the data processor within the timed interval set by timer 169 it is checked for validity to stop the timer. Otherwise, the timer energizes error lamp 171. The reply message is decoded to energize an appropriate one of the procedural guide lamps. If an "authorization"d indication is manifested, the imprint mechanism is released to permit manual imprinting of a sales slip. If any procedural lamps are energized, the terminal unit automatically hangs up.

It should be apparent that the terminal unit of the present invention need not be restricted to use in a system involving investigation of credit transactions. Rather, the same or a substantially similar terminal unit may be employed in any data communication system where the accessing of data stored at a central station is initiated in response to an inquiry from a remote station.

Accordingly, while a specific preferred embodiment of the invention has been described herein, it will be apparent that variations and modifications of the invention will occur to those of ordinary skill in the art from a consideration of the foregoing description. It is therefore desired that the present invention be limited only by the appended claims.

The invention shown in FIG. 9 is disclosed and claimed in the copending application of Thomas E. Johnson, entitled "Slide Switch Encoder," Ser. No. 20,648, filed Mar. 18, 1970, and assigned to the same assignee as is the present invention.

We claim as our invention:

1. A terminal unit for use at a remote station of a data transmission system having a central station with a data processor for accessing data from storage records and for formulating coded messages from the accessed data, said terminal unit comprising:

a memory for storing data, means for entering data into said memory in accordance with a proceeding pertaining to a record stored at said central station, initiate means operable for proving an initiate signal, read-out means, effective when activated, for reading out the contents of said memory in the form of a coded message of inquiry regarding the status of said record, for transmission to said data processor at said central station, dial means responsive to the initiate signal for acquiring a transmission channel with said central station to transmit said inquiry message to said data processor and to receive a reply message thereto from said data processor on said channel, reply detection means responsive to the contents of said reply message for visually conveying information at said record, channel detection means responsive to the establishment of a transmission channel to said central station only upon the acquiring of said transmission channel, for activating said read-out means to transmit said inquiry message, timing means responsive to the establishment of a transmission channel to said central station for initiating an interval of predetermined duration and for generating a decouple signal if a reply message has not been received at said terminal unit within the interval, said dial means responsive to the decouple signal for disconnecting said terminal unit from said transmission channel, said memory responsive to the decouple signal to remove the stored data therefrom.

2. A terminal unit as claimed in claim 1, wherein said reply detection means is responsive to reception of the reply message from a central station for providing a valid signal indicative of the receipt of the reply message, said timing means responsive to the valid signal for inhibiting the generation of a decouple signal thereby deactivating said timing means.

3. In a system for investigating the status of credit accounts from data stored at a central station by the sending of an inquiry message to the central station and the receiving of the desired data in the form of a reply message to an inquiry message regarding a specific credit account, a terminal unit disposed at a station remote from the central station for transmitting the inquiry message and for receiving reply messages comprising:

memory means for storing data regarding a particular proceeding;

entry means for manually entering data into said memory means in accordance with the proceeding pertaining to a record stored at the central station;

initiate means operable for providing an initiate signal;

readout means actuatable for reading out the data stored upon said memory means in the form of an inquiry message and for transmitting the inquiry message to the central station;

dial means responsive to the initiate signal for acquiring a transmission channel to the central station;

channel detector means responsive to the establishment of a transmission channel to the central station for actuating said readout means to transmit the inquiry message;

reply detection means responsive to the contents of the reply message from the central station for providing a first signal indicating that the status of the specific credit account is approved and for providing a second signal indicating that the status of the specific credit account is not approved;

print-out means including an imprint mechanism, said print-out means normally disposed in an inoperative mode wherein said print-out mechanism is maintained at a first position and responsive to the first signal to be disposed in an operative mode wherein said print-out mechanism may be moved between said first position and a second position to provide a print-out at said terminal unit; and erase means responsive to the return of said print-out mechanism to said first position for removing the data from said memory means.

* * * * *